(12) United States Patent
DiGiovanni et al.

(10) Patent No.: US 8,882,869 B2
(45) Date of Patent: Nov. 11, 2014

(54) METHODS OF FORMING POLYCRYSTALLINE ELEMENTS AND STRUCTURES FORMED BY SUCH METHODS

(75) Inventors: Anthony A. DiGiovanni, Houston, TX (US); Nicholas J. Lyons, Houston, TX (US); Derek L. Nelms, Tomball, TX (US); Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 408 days.

(21) Appl. No.: 13/040,947

(22) Filed: Mar. 4, 2011

(65) Prior Publication Data

US 2012/0225253 A1    Sep. 6, 2012

(51) Int. Cl.
| | |
|---|---|
| B24D 3/00 | (2006.01) |
| B24D 3/10 | (2006.01) |
| B32B 33/00 | (2006.01) |
| B24D 18/00 | (2006.01) |
| E21B 10/573 | (2006.01) |
| B24D 99/00 | (2010.01) |
| C22C 26/00 | (2006.01) |
| C22C 1/05 | (2006.01) |
| C22C 29/06 | (2006.01) |
| C22C 29/14 | (2006.01) |

(52) U.S. Cl.
CPC .......... B24D 18/0009 (2013.01); C22C 29/06 (2013.01); E21B 10/5735 (2013.01); B24D 99/005 (2013.01); C22C 26/00 (2013.01); C22C 1/051 (2013.01); C22C 29/14 (2013.01); C22C 2204/00 (2013.01); B22F 2999/00 (2013.01)
USPC ............................................. 51/307; 175/434

(58) Field of Classification Search
USPC ............................. 51/293; 175/434; 428/161
See application file for complete search history.

(56) References Cited

U.S. PATENT DOCUMENTS

| | | | |
|---|---|---|---|
| 2,768,109 A | 10/1956 | Coover | |
| 4,808,659 A | 2/1989 | Nishihara et al. | |
| 5,954,147 A | 9/1999 | Overstreet et al. | |
| 6,077,591 A * | 6/2000 | Griffin | 428/172 |
| 7,753,143 B1 | 7/2010 | Miess et al. | |
| 7,942,219 B2 | 5/2011 | Keshavan et al. | |
| 2008/0023230 A1 * | 1/2008 | Cho | 175/432 |
| 2010/0181117 A1 | 7/2010 | Scott | |
| 2010/0243337 A1 | 9/2010 | Scott | |
| 2010/0282519 A1 * | 11/2010 | Zhang et al. | 175/434 |

(Continued)

OTHER PUBLICATIONS

International Search Report for International Application No. PCT/US2012/027068 dated Sep. 3, 2012, 3 pages.

(Continued)

*Primary Examiner* — Pegah Parvini
(74) *Attorney, Agent, or Firm* — TraskBritt

(57) ABSTRACT

Methods of forming a polycrystalline element comprise forming a polycrystalline table on a first substrate. Catalyst material may be removed from at least a portion of the polycrystalline table. The polycrystalline table and a portion of a first substrate attached to the polycrystalline table may be removed from a remainder of the first substrate. The portion of the first substrate may be attached to another substrate. Polycrystalline elements comprise a polycrystalline table attached to a portion of a first substrate on which the polycrystalline table was formed another substrate attached to the portion of the first substrate.

17 Claims, 7 Drawing Sheets

(56) References Cited

U.S. PATENT DOCUMENTS

| | | |
|---|---|---|
| 2011/0023375 A1 | 2/2011 | Sani et al. |
| 2011/0036641 A1 | 2/2011 | Lyons |
| 2011/0036643 A1 | 2/2011 | Belnap et al. |
| 2011/0042149 A1 | 2/2011 | Scott et al. |

OTHER PUBLICATIONS

International Written Opinion for International Application No. PCT/US2012/027068 dated Sep. 4, 2012, 3 pages.

International Preliminary Report on Patentability for International Application No. PCT/US2012/027068 dated Sep. 10, 2013, 5 pages.

* cited by examiner

METHODS OF FORMING POLYCRYSTALLINE ELEMENTS AND STRUCTURES FORMED BY SUCH METHODS

FIELD

Embodiments of the present invention relate generally to bearings and cutting elements for earth-boring tools and to methods of forming such bearings and cutting elements. Specifically, embodiments of the disclosure relate to methods of attaching a polycrystalline table to a substrate and bearings and cutting elements formed by such methods.

BACKGROUND

Earth-boring tools for forming wellbores in subterranean earth foil nations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit.

The cutting elements used in such earth-boring tools often include polycrystalline diamond compact (often referred to as "PDC") cutting elements, also termed "cutters," which are cutting elements that include a polycrystalline diamond (PCD) material, which may be characterized as a superabrasive or superhard material. Such polycrystalline diamond materials are formed by sintering and bonding together relatively small synthetic, natural, or a combination of synthetic and natural diamond grains or crystals, termed "grit," under conditions of high temperature and high pressure in the presence of a catalyst, such as, for example, cobalt, iron, nickel, or alloys and mixtures thereof, to thin a layer of polycrystalline diamond material, also called a diamond table. These processes are often referred to as high temperature/high pressure (HTHP) processes. The cutting element substrate may comprise a cermet material, i.e., a ceramic-metal composite material, such as, for example, cobalt-cemented tungsten carbide. In some instances, the polycrystalline diamond table may be formed on the cutting element, for example, during the HTHP sintering process. In such instances, cobalt or other catalyst material in the cutting element substrate may be swept into the diamond grains or crystals during sintering and serve as a catalyst material for foaming a diamond table from the diamond grains or crystals. Powdered catalyst material may also be mixed with the diamond grains or crystals prior to sintering the grains or crystals together in an HTHP process. In other methods, however, the diamond table may be formed separately from the cutting element substrate and subsequently attached thereto.

BRIEF SUMMARY

In some embodiments, the disclosure includes methods of forming a polycrystalline element comprising forming a polycrystalline table on a first substrate. Catalyst material may be removed from at least a portion of the polycrystalline table. The polycrystalline table and a portion of a first substrate attached to the polycrystalline table may be removed from a remainder of the first substrate. The portion of the first substrate may be attached to another substrate.

In some embodiments, the disclosure includes methods of forming a polycrystalline element comprising subjecting a plurality of particles comprising a superabrasive material disposed on an end of a mass of hard material to a high temperature/high pressure (HTHP) process in the presence of a catalyst material to form a polycrystalline table attached to a first substrate. The catalyst material may be removed from at least a portion of the polycrystalline table. The polycrystalline table and a portion of the first substrate attached to the polycrystalline table may be removed from a remainder of the first substrate. The portion of the first substrate may be attached to another substrate, the portion of the first substrate being interposed between the polycrystalline table and the another substrate.

In some embodiments, the first substrate may be merely rough ground to remove some substrate material and is then attached to another substrate.

In yet further embodiments, the disclosure includes polycrystalline elements comprising a polycrystalline table attached to a portion of a first substrate on which the polycrystalline table was formed and another substrate attached to the portion of the first substrate.

BRIEF DESCRIPTION OF THE DRAWINGS

While the specification concludes with claims particularly pointing out and distinctly claiming that which is regarded as the present invention, various features and advantages of embodiments of this invention may be more readily ascertained from the following description of embodiments of the invention when read in conjunction with the accompanying drawings, in which:

DETAILED DESCRIPTION

The illustrations presented herein are not meant to be actual views of any particular earth-boring tool, cutting element, or bearing, but are merely idealized representations that are employed to describe the embodiments of the disclosure. Additionally, elements common between figures may retain the same or similar numerical designation.

Although some embodiments of the disclosure are depicted as being used and employed in earth-boring drill bits, such as earth-boring rotary drill bits, sometimes referred to as "roller cone" or "rolling cone" bits, persons of ordinary skill in the art will understand that diamond-bearing structures in accordance with the disclosure may be employed in any earth-boring tool employing a structure comprising a polycrystalline superabrasive material attached to a supporting substrate. Accordingly, the terms "earth-boring tool" and "earth-boring drill bit," as used herein, mean and include any type of bit or tool used for drilling during the formation or enlargement of a wellbore in a subterranean formation and include, for example, fixed-cutter bits, percussion bits, core bits, eccentric bits, bicenter bits, reamers, mills, drag bits, hybrid bits, and other drilling bits and tools known in the art.

As used herein, the term "polycrystalline table" means and includes any structure comprising a plurality of grains (i.e., crystals) of superabrasive, also known in the art as superhard, material that are bonded directly together by inter-granular bonds. The crystal structures of the individual grains of the material may be randomly oriented in space within the polycrystalline material.

As used herein, the term "inter-granular bond" means and includes any direct atomic bond (e.g., covalent, metallic, etc.) between atoms in adjacent grains of superabrasive material.

Figure 1:
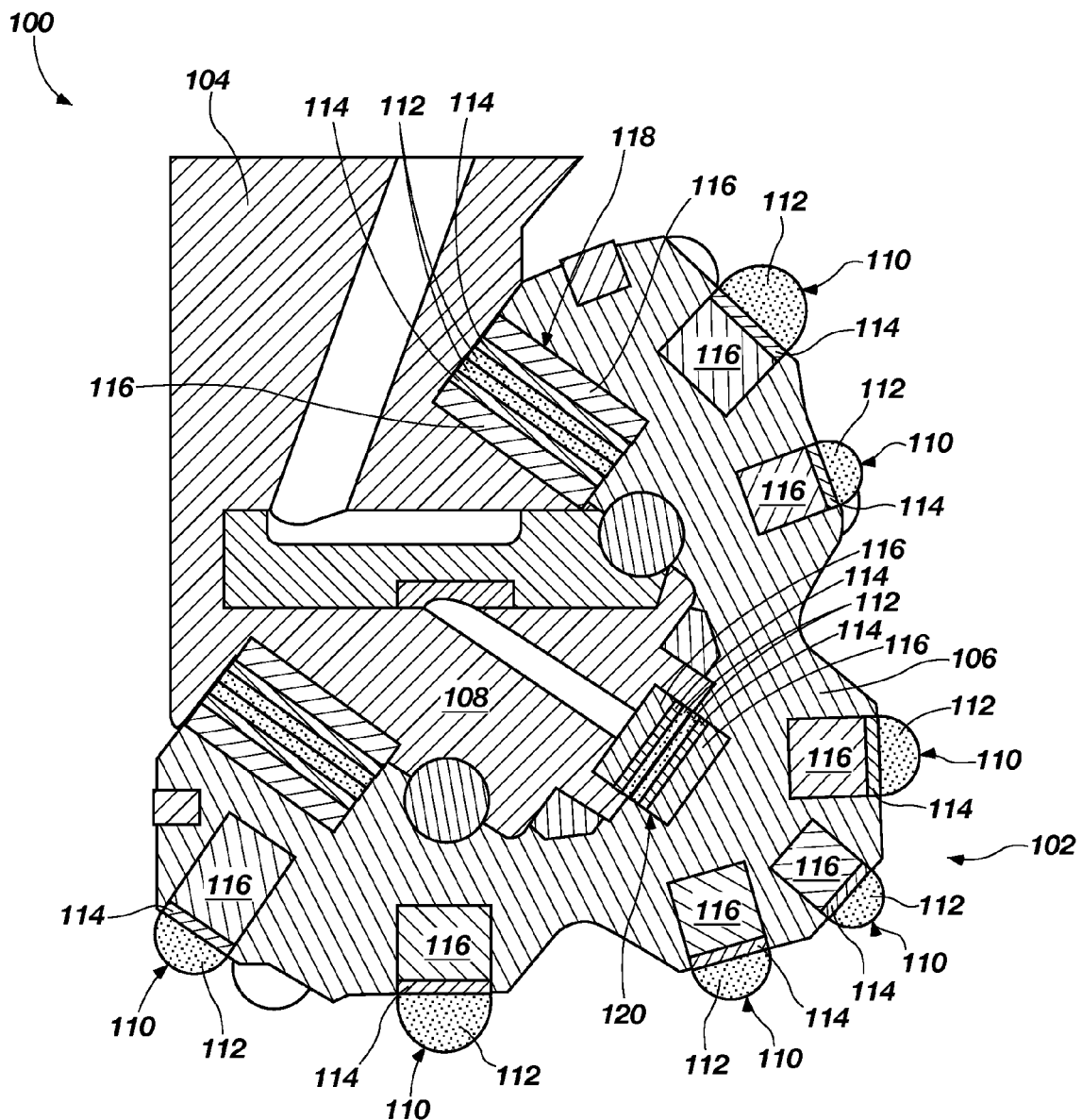
FIG. 1 is a cross-sectional view of a roller cone of an earth-boring rotary drill bit.

Referring to FIG. 1, a cross-sectional view of a roller cone 102 of an earth-boring rotary drill bit 100, commonly termed a "rock" bit, is shown. The earth-boring rotary drill bit 100 includes a bit body (not shown) having legs 104 depending from the body. A roller cone 106 is rotatably mounted to a bearing pin 108 on each of the legs 104. Each roller cone 106 may comprise a plurality of cutting elements, such as inserts 110 disposed in recesses formed in the roller cone 106 and attached to the roller cone 106. Each insert 110 may comprise a polycrystalline table 112 attached to a portion 114 (e.g., a layer) of a first substrate. The portion 114 of the first substrate may be attached to another substrate 116. The drill bit 100 also comprises a bearing system. The bearing system includes a radial bearing assembly 118 and an axial bearing assembly 120. The radial bearing assembly 118 and the axial bearing assembly 120 may comprise abutting polycrystalline tables 112 attached to portions 114 of first substrates. Each portion 114 of a first substrate may be attached to another substrate 116. The abutting polycrystalline tables 112 may be configured to rotate slidably against one another.

As the drill bit 100 rotates, the roller cone 102 may rotate about the bearing pin 108 and roll around a bottom of a wellbore. The polycrystalline tables 112 of inserts 110 may impact and crush an underlying earth formation. In addition, the radial bearing assembly 118 may bear radial forces acting on the roller cone 102 as its abutting polycrystalline tables 112 slide against one another. The axial bearing assembly 120 may bear axial forces acting on the roller cone 102 as its abutting polycrystalline tables 112 slide against one another.

Figure 2:
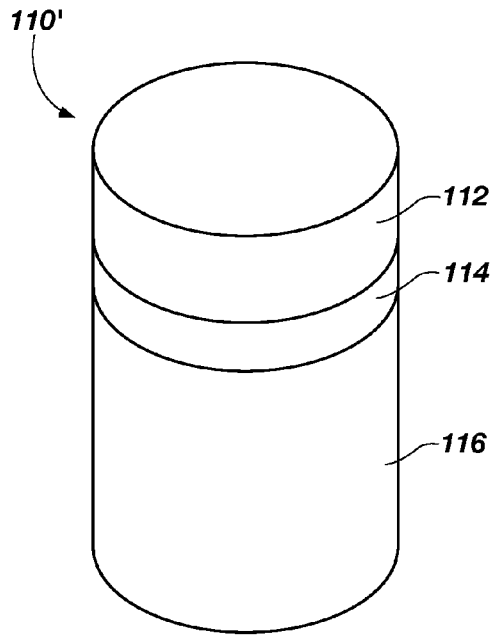
FIG. 2 illustrates a perspective view of a cutting element having a disc-shaped polycrystalline table according to an embodiment of the disclosure.

Referring to FIG. 2, a cutting element 110' according to an embodiment of the disclosure is shown. The cutting element 110' comprises a polycrystalline table 112 attached to a portion 114 of a first substrate, another portion opposite that to which polycrystalline table 112 is attached having been removed. Portion 114 may also be characterized as a residual substrate. The portion 114 of the first substrate may be attached, in turn, to another substrate 116. Thus, the portion 114 of the first substrate may be interposed between the polycrystalline table 112 and the other substrate 116. The cutting element 110' may be substantially cylindrical, the substrate 116 comprising a cylinder, the polycrystalline table 112 comprising a disc, and the portion 114 of the first substrate comprising a disc. In some embodiments, a chamfer or beveled edge may be disposed between a side surface and a cutting face of the polycrystalline table 112. The cutting element 110' may comprise a cutting element 110' conventionally attached to and deployed with a fixed-cutter earth-boring drill bit, which is also commonly termed a "drag" bit.

Figure 3:
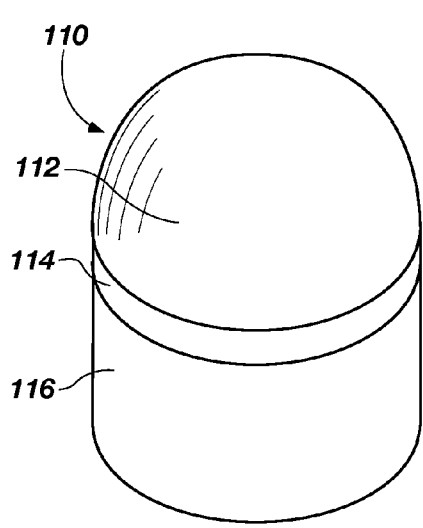
FIG. 3 illustrates a perspective view of a cutting element having a dome-shaped polycrystalline table according to another embodiment of the disclosure.

Referring to FIG. 3, an insert 110 according to another embodiment of the disclosure is shown. The insert 110 comprises a polycrystalline table 112 attached to a portion 114 of a first substrate. The portion 114 of the first substrate may be attached, in turn, to another substrate 116. Thus, the portion 114 of the first substrate may be interposed between the polycrystalline table 112 and the other substrate 116. The substrate 116 comprises a cylinder and the portion 114 of the first substrate comprises a disc disposed on the substrate. The polycrystalline table 112 comprises a hemisphere. Thus, the insert 110 may comprise a dome-shaped cutting surface. In other embodiments, the polycrystalline table 112 may comprise, for example, a chisel shape, a tombstone shape, or other cutting shapes and surfaces known in the art. The insert 110 may be of a type typically attached to and deployed with a roller cone 102 of an earth-boring rotary drill bit 100 (see FIG. 1).

Figure 4:
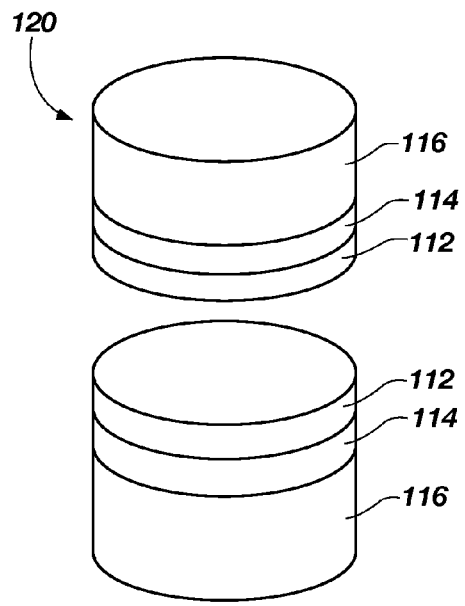
FIG. 4 illustrates an exploded perspective view of an axial bearing according to an embodiment of the disclosure.

Referring to FIG. 4, an axial bearing assembly 120 according to an embodiment of the disclosure is shown. The axial bearing assembly 120 may be configured to accommodate axial forces acting on the axial bearing assembly 120 during relative movement of the components thereof. The axial bearing assembly 120 comprises two opposing polycrystalline tables 112. The polycrystalline tables 112 may comprise discs. When in use, opposing flat, circular surfaces of the polycrystalline tables 112 may abut against one another. The opposing flat, circular surfaces of the polycrystalline tables 112 may slide against one another as at least one of the polycrystalline tables 112 rotates about its central longitudinal axis. Each polycrystalline table 112 may be attached to a portion 114 of a first substrate. The portion 114 of the first substrate may be attached, in turn, to another substrate 116. Thus, the portion 114 of the first substrate may be interposed between the polycrystalline table 112 and the other substrate 116. The portion 114 of the first substrate may comprise a disc, and the other substrate 116 may comprise a cylinder. Thus, the axial bearing assembly 120 may comprise two opposing cylinders.

Figure 5:
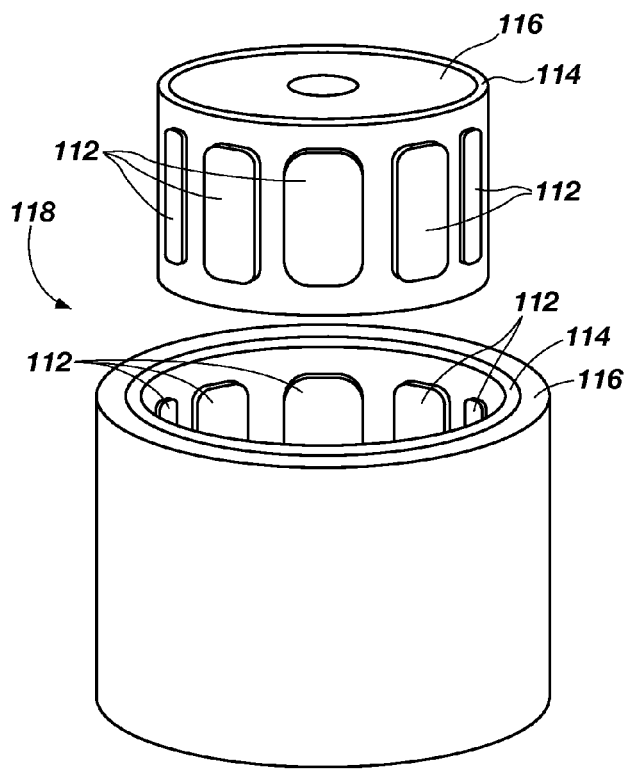
FIG. 5 illustrates an exploded perspective view of a radial bearing according to another embodiment of the disclosure.

Referring to FIG. 5, a radial bearing assembly 118 according to an embodiment of the disclosure is shown. The radial bearing assembly 118 may be configured to accommodate radial forces acting on the radial bearing assembly 118 during relative movement of the components thereof. The radial bearing assembly 118 comprises a plurality of opposing polycrystalline tables 112. The polycrystalline tables 112 may comprise bearing pads. When in use, a radially outer surface of one polycrystalline table 112 may abut against a radially inner surface of the other polycrystalline table 112, the one polycrystalline table 112 being concentrically nested within the other polycrystalline table 112. The opposing surfaces of the polycrystalline tables 112 may slide against one another as at least some of the polycrystalline tables 112 rotate about a central axis of the radial bearing assembly 118. Each polycrystalline table 112 may be attached to a portion 114 of a first substrate. The portion 114 of the first substrate may be attached, in turn, to another substrate 116. Thus, the portion 114 of the first substrate may be interposed between the polycrystalline table 112 and the other substrate 116. Each of the portions 114 of the first substrate and the other substrate 116 may comprise annular members disposed radially adjacent to one another. The portion 114 of the first substrate and the other substrate 116 may comprise, therefore, concentric rings having polycrystalline tables attached to the portions 114 of the first substrates thereof. Thus, the radial bearing assembly 118 may comprise two concentrically nested annular members.

The polycrystalline table 112 of any of the embodiments shown in FIGS. 2 through 5 may comprise a superabrasive, sometimes referred to as superhard, material. For example, the polycrystalline table 112 may comprise synthetic diamond, natural diamond, a combination of synthetic diamond and natural diamond, cubic boron nitride, or other superabrasive materials known in the art. In some embodiments, the polycrystalline table 112 may comprise a plurality of interbonded grains of superabrasive material of at least substantially uniform size. In other embodiments, the polycrystalline table 112 may comprise a plurality of interbonded grains of superabrasive material of non-uniform size. For example, interbonded grains of superabrasive material of different sizes (i.e., grains having a multi-modal size distribution) may be interspersed throughout the polycrystalline table in a substantially uniform fashion. As another example, interbonded grains of superabrasive material may be disposed in layers, each layer having a different average grain size, to form a layered polycrystalline table. As a yet further example, interbonded grains of superabrasive material may be graded, the average grain size gradually increasing or decreasing in a direction through the polycrystalline table 112.

The portion 114 of the first substrate and the other substrate 116 may comprise a hard material. The hard material may comprise, for example, a ceramic-metal composite material (i.e., a "cermet" material) comprising a plurality of hard ceramic particles dispersed throughout a metal matrix material. The hard ceramic particles may comprise carbides, nitrides, oxides, and borides (including boron carbide ($B_4C$)). More specifically, the hard ceramic particles may comprise carbides and borides made from elements such as W, Ti, Mo, Nb, V, Hf, Ta, Cr, Zr, Al, and Si. By way of example and not limitation, materials that may be used to form hard ceramic particles include tungsten carbide (WC, $W_2C$, and combinations of WC and $W_2C$), titanium carbide (TiC), tantalum carbide (TaC), titanium diboride ($TiB_2$), chromium carbides, titanium nitride (TiN), aluminium oxide ($Al_2O_3$), aluminium nitride (AlN), and silicon carbide (SiC). The metal matrix material of the ceramic-metal composite material may include, for example, cobalt-based, iron-based, nickel-based, iron- and nickel-based, cobalt- and nickel-based, and iron- and cobalt-based alloys. The matrix material may also be selected from commercially pure elements such as, for example, cobalt, iron, and nickel. For example, the hard material may comprise a plurality of tungsten carbide particles in a cobalt matrix. In some embodiments, the portion 114 of the first substrate and the other substrate 116 may comprise hard particles of at least substantially uniform size. In other embodiments, the portion 114 of the first substrate and the other substrate 116 may comprise hard particles having a multi-modal size distribution. In some embodiments, an average particle size of hard particles of the portion 114 of the first substrate may be substantially equal to an average particle size of hard particles of the other substrate 116. In other embodiments, the average particle size of hard particles of the portion 114 of the first substrate may substantially differ from the average particle size of hard particles of the other substrate 116. For example, the average particle size of hard particles of the portion 114 of the first substrate may be substantially greater than, such as, for example, at least two times greater than, the average particle size of hard particles of the other substrate 116.

Figure 6:
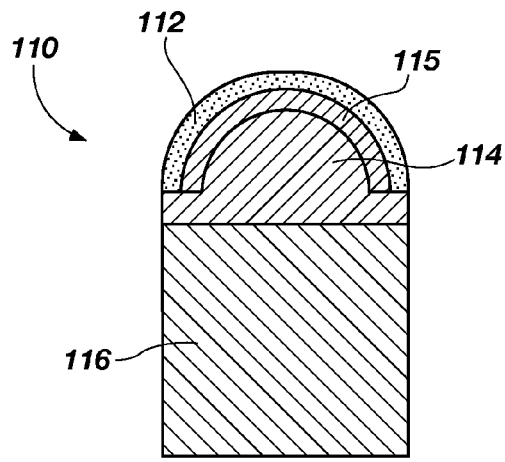
FIG. 6 illustrates a cross-section of a cutting element having a dome-shaped polycrystalline table according to an embodiment of the disclosure.

Referring to FIG. 6, a cross-section of an insert 110 cutting element having a dome-shaped polycrystalline table 112 is shown. The insert 110 comprises a polycrystalline table 112 attached to a portion 114 of a first substrate. The polycrystalline table 112 comprises a hollow dome shape, and the portion 114 of the first substrate comprises a dome-shaped protrusion abutting the polycrystalline table 112. The portion 114 of the first substrate may comprise an intermediate layer 115 adjacent the polycrystalline table 112. The intermediate layer 115 may comprise a mixture of particles comprising a superabrasive material and particles comprising a hard material, as described previously herein. The intermediate layer 115 may comprise a graded layer of the portion 114 of the first substrate to transition from the material of the polycrystalline table 112 to the material of a remainder of the portion 114 of the first substrate. In other embodiments, multiple intermediate layers 115 may be provided with the portion 114 of the first substrate. The portion 114 of the first substrate may be attached to another substrate 116. Thus, the portion 114 of the first substrate may be interposed between the polycrystalline table 112 and the other substrate 116.

Figure 7:
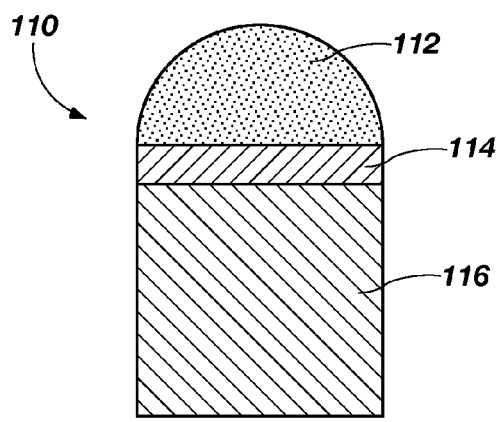
FIG. 7 illustrates a cross-section of another cutting element having a dome-shaped polycrystalline table according to another embodiment of the disclosure.

Referring to FIG. 7, a cross-section of another insert 110 cutting element having a dome-shaped polycrystalline table 112 is shown. The insert 110 comprises a polycrystalline table 112 attached to a portion 114 of a first substrate. The polycrystalline table 112 comprises a solid dome shape, such as, for example, a hemisphere. The polycrystalline table 112 may be attached to a substantially disc-shaped portion 114 of a first substrate. The portion 114 of the first substrate may be attached, in turn, to another substrate 116. Thus, the portion 114 of the first substrate may be interposed between the polycrystalline table 112 and the other substrate 116.

Figure 8:
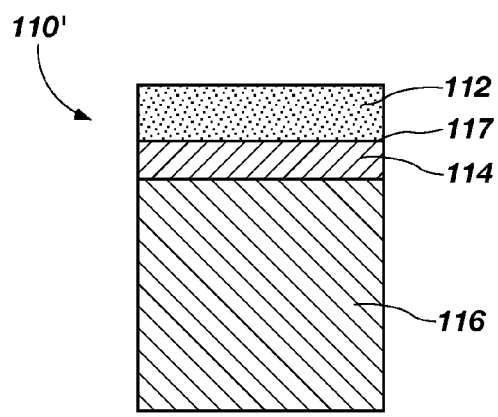
FIG. 8 illustrates a cross-section of a cutting element having a disc-shaped polycrystalline table according to an embodiment of the disclosure.

Referring to FIG. 8, a cross-section of a cutting element 110' having a disc-shaped polycrystalline table 112 is shown. The cutting element 110' comprises a polycrystalline table 112 attached to a portion 114 of a first substrate. The polycrystalline table 112 comprises a cylinder or disc shape. The portion 114 of the first substrate likewise comprises a cylinder or disc shape. An interface 117 between the polycrystalline table 112 and the portion 114 of the first substrate may be planar or substantially planar. The portion 114 of the first substrate may be attached to another substrate 116. Thus, the portion 114 of the first substrate may be interposed between the polycrystalline table 112 and the other substrate 116.

Figure 9:
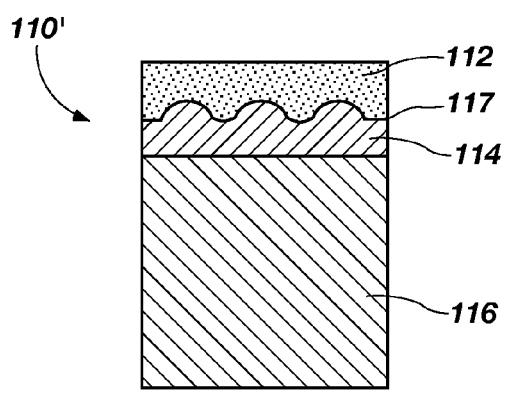
FIG. 9 illustrates a cross-section of a cutting element having a polycrystalline table according to another embodiment of the disclosure.

Referring to FIG. 9, a cross-section of another cutting element 110' having a polycrystalline table 112 is shown. The cutting element 110' comprises a polycrystalline table attached to a portion 114 of a first substrate. The polycrystalline table 112 comprises a substantially cylinder or substantially disc-like shape. Likewise, the portion 114 of the first substrate comprises a substantially cylinder or substantially disc-like shape. An interface 117 between the polycrystalline table 112 and the portion 114 of the first substrate may comprise a non-planar interface design, such as, for example, alternating protrusions and recesses, an annulus, radially extending spokes, or other non-planar interface designs known in the art. The portion 114 of the first substrate may be attached to another substrate 116. Thus, the portion 114 of the first substrate may be interposed between the polycrystalline table 112 and the other substrate 116.

Figure 10:
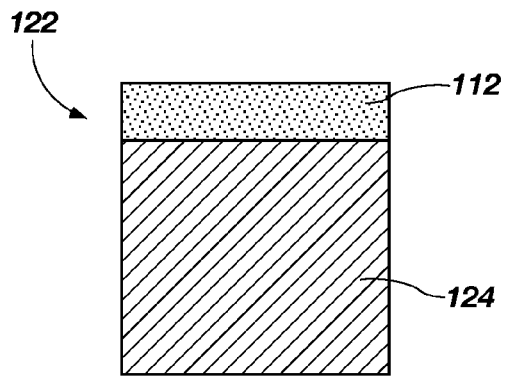
FIGS. 10 through 13 illustrate schematically a method of attaching a polycrystalline table to a substrate according to an embodiment of the disclosure.

Referring to FIGS. 10 through 13, a method of attaching a polycrystalline table to a substrate according to an embodiment of the disclosure is shown. Shown in FIG. 10 is an intermediate structure 122 in the process of forming a cutting element or other structure comprising a polycrystalline table attached to a substrate. The intermediate structure 122 comprises a polycrystalline table 112 attached to a first substrate 124. The intermediate structure 122 may be formed, for example, by disposing a mass of hard material, a plurality of particles comprising a superabrasive material, and a catalyst material into a mold. The hard material may comprise, for example, any of the hard materials described previously. As a specific, non-limiting example, the hard material may comprise a plurality of tungsten carbide particles in a cobalt matrix, known in the art as cobalt-cemented tungsten carbide. The hard material may be present in the form of a fully sintered (i.e., having a final density) part. The superabrasive material may comprise, for example, any of the superabrasive materials described previously. The catalyst material may comprise, for example, an alloy (e.g., cobalt-based, iron-based, nickel-based, iron and nickel-based, cobalt and nickel-based, and iron and cobalt-based alloys) or a commercially pure element (e.g., cobalt, iron, and nickel) that catalyzes grain growth and intergranular bonding.

The superabrasive particles may be layered on an end of a mass of the hard particles, and the particles comprising a catalyst material may be dispersed among the hard particles and, optionally, among the superabrasive particles. In another embodiment, a preformed substrate of hard particles may be placed in a mold and superabrasive particles may be placed over the substrate. Catalyst material may reside in the substrate, be dispersed among the superabrasive particles, or placed between the superabrasive particles and an adjacent end of the substrate, all as known in the art.

A sintering process, such as, for example, an HTHP process, as known in the art, may be applied to the particles in the mold. In some embodiments, the pressure used in the sintering process may be at least five gigapascals (5 GPa). For example, the peak pressure may be eight gigapascals (8 GPa) or even ten gigapascals (10 GPa). As a result of the sintering process, a polycrystalline table 112 comprising a superabrasive material may be formed on a first substrate 124 comprising a hard material.

Figure 11:
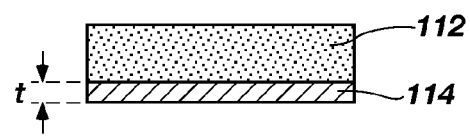

As shown in FIG. 11, the polycrystalline table 112 and a portion 114 of the first substrate 124 may be removed from a remainder of the first substrate 124. The portion 114 of the first substrate 124 may remain attached to the polycrystalline table. The polycrystalline table 112 and the portion 114 of the first substrate 124 may be removed from the remainder of the first substrate 124 using, for example, electric discharge machining (EDM), a diamond saw, grinding, or other methods for machining hard substrates known in the art. The thickness t of the portion 114 of the first substrate 124 may be minimized in some embodiments. For example, the portion 114 of the first substrate 124 may have a thickness t less than one millimeter (1 mm). In other embodiments, however, the thickness t of the portion 114 of the first substrate 124 may not be minimized. For example, the portion 114 of the first substrate 124 may have a thickness t greater than one millimeter (1 mm). In alternative embodiments, the polycrystalline table may be formed on a first substrate having a reduced thickness t, rather than forming the polycrystalline table on a first substrate and removing a remainder of the first substrate to the reduced thickness t.

Figure 12:
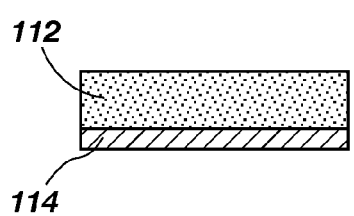

The polycrystalline table 112 and the portion 114 of the first substrate 124 may then be leached to remove catalyst material therefrom. The leached polycrystalline table 112 and the leached portion 114 of a first substrate 124 attached to the polycrystalline table 112 are shown in FIG. 12. Catalyst material disposed in interstitial spaces between interbonded grains of the superabrasive material of the polycrystalline table 112 and disposed in spaces between hard particles of the portion 114 of the first substrate 124 may be removed, for example, using aqua regia, or other leaching agents or methods known in the art. In some embodiments, catalyst material may be substantially completely leached from both the polycrystalline table 112 and the portion 114 of the first substrate 124 attached thereto. In other embodiments, at least some catalyst material may remain in the portion 114 of the first substrate 124 attached to the polycrystalline table 112. In still other embodiments, at least some catalyst material may remain in the polycrystalline table 112 as well. Penetration of the leaching agent may be controlled to leach only a selected portion of the polycrystalline table 112, the portion 114 of the first substrate 124, or both. In one embodiment, the polycrystalline table may have catalyst removed therefrom to a depth of between, for example, about 0.04 mm and 0.5 mm from the cutting face and side surface.

In one embodiment, for example, the average grain size of the interbonded grains of the polycrystalline table 112 and the average particle size of the hard particles of the portion 114 of the first substrate 124 may be selected to provide a desired volume percentage of interstitial spaces between the interbonded grains and the hard particles, in which catalyst material may be disposed. As another example, the average grain size of the interbonded grains of the polycrystalline table 112 and the average particle size of the hard particles of the portion 114 of the first substrate 124 may be selected to provide a desired permeability. A leach rate may be determined based on the desired volume percentage of interstitial spaces in which catalyst material may be disposed or based on the desired permeability and used to determine how long to leach in order to achieve a selected leach depth. In yet further embodiments, the polycrystalline table 112 and the portion 114 of the first substrate 124 attached thereto may not be subjected to a leaching process.

In embodiments where a leaching process is used to remove catalyst material from at least one of the polycrystalline table 112 and the portion 114 of the first substrate 124, at least a portion of the polycrystalline table 112 and/or the portion 114 of the first substrate 124 that has been leached may, optionally, be reinfiltrated. For example, a material may be reinfiltrated into the portion 114 of the first substrate 124, leaving the interstitial spaces between interbonded grains of the polycrystalline table 112 devoid of other material (i.e., filled with air or other environmental fluids). The material reinfiltrated into the polycrystalline table 112 and/or the portion 114 of the first substrate 124 may comprise a catalyst material or an inert material. As a non-limiting example, silicon (Si) may be reinfiltrated into at least a portion of the polycrystalline table 112 and/or the portion 114 of the first substrate 124 that has been leached.

In addition, leaching may remove material that acted as a binder to provide structural integrity to the structure of the polycrystalline table 112 and the portion 114 of the first substrate 124. Further, residual stresses may weaken the portion 114 of the first substrate 124 after leaching, potentially to the point of damaging the portion 114. Placing the portion 114 of the first substrate 124 in a state of compression, for example, by disposing a ring around the periphery of the portion 114 of the first substrate 124 may enable the portion 114 of the first substrate 124 to maintain its structural integrity during and after leaching. In some embodiments, the ring may comprise a ceramic or carbide ring that has been shrink fit around at least the portion 114 of the first substrate 124 and, optionally, around the polycrystalline table 112. In other embodiments, the polycrystalline table 112 may be oversized and comprise an annular portion that extends at its periphery down and around the portion 114 of the first substrate. The ring or annular portion of the polycrystalline table 112 may be subsequently removed once sufficient structural integrity has been achieved, for example, by reinfiltrating as described above or by attachment to another substrate as described below.

Figure 13:
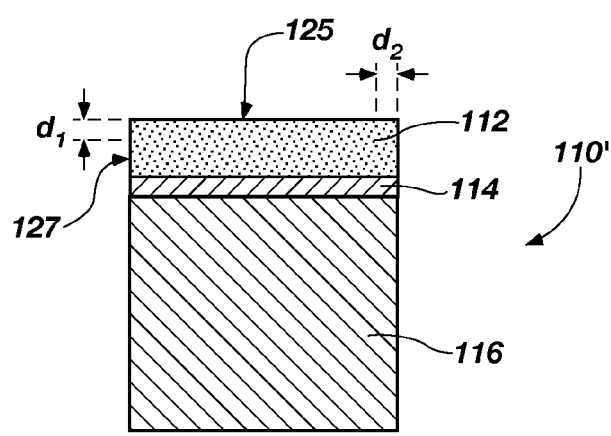

As shown in FIG. 13, the polycrystalline table 112 and the portion 114 of the first substrate 124 may be attached to another substrate 116 to fowl a cutting element 110'. In other embodiments, a portion of a first substrate attached to a polycrystalline table may be attached to another substrate to form an axial bearing or a radial bearing. The portion 114 of the first substrate 124 may be directly attached to the other substrate 116. Thus, the portion 114 of the first substrate 124 may be interposed between the polycrystalline table 112 and the other substrate 116. The portion 114 of the first substrate 124 attached to the polycrystalline table 112 may be attached to the other substrate 116 by, for example, brazing, microwave brazing, welding, hot pressing, or using a sintering process. For example, an HTHP process, as known in the art, may be applied to the components in a mold. In some embodiments, the pressure used in the sintering process may be at least five gigapascals (5 GPa). For example, the peak pressure may be eight gigapascals (8 GPa) or even ten gigapascals (10 GPa).

The material composition of the portion 114 of the first substrate 124 may be selected to optimize attachment to the polycrystalline table 112 and subsequent attachment to the other substrate 116. For example, the portion 114 of the first substrate 124 may comprise a greater volume percentage of catalyst material than the other substrate 116 prior to leaching, enabling the portion 114 of the first substrate 124 to adequately catalyze formation of the polycrystalline table 112 while the other substrate 116 provides additional structural strength and durability to the insert 110. The portion 114 of the first substrate 124, therefore, may enable formation of a polycrystalline table 112 attached thereto while facilitating attachment to another substrate 116 to increase strength and durability of the resulting structure. In particular, the portion 114 of the first substrate 124 may enable the polycrystalline table 112 to be reattached to another substrate 116 while retaining a stronger attachment between the polycrystalline table 112 and the portion 114 of the first substrate 124.

In embodiments where the polycrystalline table 112 and the portion 114 of the first substrate 124 are attached to the other substrate 116 using a sintering process, catalyst material may be swept from the other substrate 116 into the portion 114 of the first substrate 124 and the polycrystalline table 112. Catalyst material remaining in the portion 114 of the first substrate 124 may also be swept from the portion 114 of the first substrate 124 into the polycrystalline table 112. The catalyst material from the other substrate 116 may be a different catalyst material than the catalyst material used initially to form the polycrystalline table 112. For example, the polycrystalline table 112 may be formed in the presence of a cobalt-based alloy, which may then be at least substantially removed from the polycrystalline table, and the catalyst material swept from the other substrate 116 into the polycrystalline table 112 may comprise a nickel-based alloy. As another example, the polycrystalline table 112 may be formed in the presence of a cobalt-based alloy, which may then be at least substantially removed from the polycrystalline table, and the catalyst material swept from the other substrate 116 into the polycrystalline table 112 may comprise commercially pure cobalt. The polycrystalline table 112 may subsequently be subjected to another leaching process to remove catalyst material from at least a portion thereof. For example, catalyst material may be removed from a cutting face 125 of the polycrystalline table 112 to a selected depth $d_1$ within the polycrystalline table 112. The cutting face 125 may be substantially free of catalyst material. As another example, catalyst material may also be removed from a side surface 127 of the polycrystalline table 112 to a selected depth $d_2$ within the polycrystalline table 112.

Figure 14:
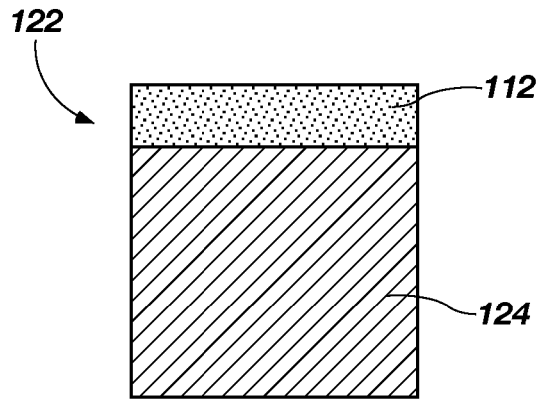
FIGS. 14 through 16 illustrate schematically another method of attaching a polycrystalline table to a substrate in accordance with an embodiment of the disclosure.
Figure 15:
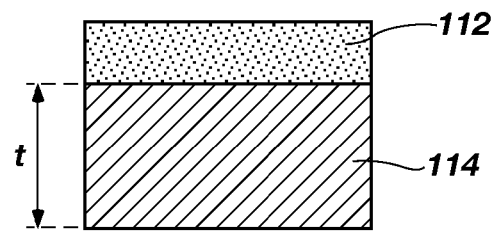
Figure 16:
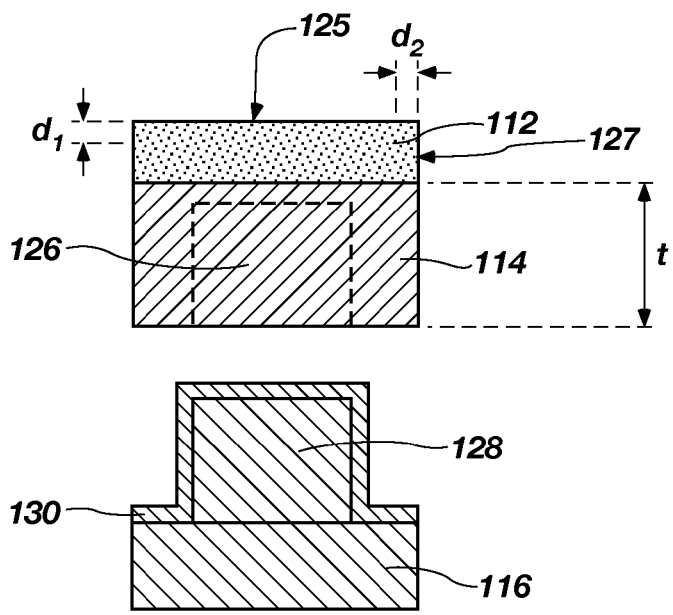

Referring to FIGS. 14 through 16, another method of attaching a polycrystalline table to a substrate according to another embodiment of the disclosure is shown schematically. Shown in FIG. 14 is an intermediate structure 122 in the process of forming a cutting element or other structure comprising a polycrystalline table attached to a substrate. The intermediate structure 122 comprises a polycrystalline table 112 attached to a first substrate 124. The intermediate structure 122 may be formed, for example, by disposing hard particles, such as, for example, particles of tungsten carbide, superabrasive particles, such as, for example, natural diamond particles, synthetic diamond particles, a combination of natural and synthetic diamond particles, and particles comprising a catalyst material, such as, for example, cobalt particles, into a mold. The superabrasive particles may be layered on an end of the hard particles, and the particles comprising a matrix material may be dispersed among the superabrasive particles and the hard particles. A sintering process, such as, for example an HTHP process as known in the art, may be applied to the particles in the mold. In some embodiments, the pressure applied to the particles in the mold may exceed five gigapascals (5 GPa). For example, the pressure applied to the particles in the mold may comprise eight gigapascals (8 GPa) or even ten gigapascals (10 GPa). As a result, a polycrystalline table 112 comprising a superabrasive material may be formed on a first substrate 124 comprising a hard material.

As shown in FIG. 15, the polycrystalline table 112 and a portion 114 of the first substrate 124 may be removed from a remainder of the first substrate 124. The portion 114 of the first substrate 124 may remain attached to the polycrystalline table. The polycrystalline table 112 and the portion 114 of the first substrate 124 may be removed using, for example, EDM, a diamond saw, grinding, or other hard substrate machining processes known in the art. The thickness t of the portion 114 of the first substrate 124 may comprise up to about two-thirds (⅔) of the total thickness of the resulting structure, in this embodiment of the resulting cutting element. In alternative embodiments, the polycrystalline table may be formed on a first substrate having a reduced thickness t, rather than forming the polycrystalline table on a first substrate and removing a remainder of the first substrate to the reduced thickness t.

A recess 126, as shown in FIG. 16, may be formed at least partially through the thickness t of the portion 114 of the first substrate 124. The recess 126 may comprise a blind bore formed from a surface of the portion 114 of the first substrate 124 opposing the polycrystalline table 112 to a selected depth (e.g., depth $d_1$ and/or depth $d_2$, as shown in FIG. 16) within the thickness t of the portion 114 of the first substrate 124. The recess 126 may comprise, for example, a cylindrical or substantially cylindrical hole formed in the portion 114 of the first substrate 124. The recess 126 may be formed using plunge EDM, laser machining, carbide ultrasonic machining, a combination of any of plunge EDM, laser machining, and carbide ultrasonic machining, or any other process for forming a recess in a hard substrate known in the art. Thus, the portion 114 of the first substrate 124 may comprise an annular member attached at a periphery of the polycrystalline table 112. In some embodiments, the recess may extend through the portion 114 of the first substrate 124 to terminate at the polycrystalline table 112. In other embodiments, the recess may extend into the portion 114 of the first substrate 124 and terminate within the portion 114 adjacent to the polycrystalline table 112. Though the recess 126 is shown as a substantially cylindrical bore extending into the portion 114 of the first substrate 124, other non-planar interface designs, such as, for example, radially extending spokes, an annulus, or other shapes as known in the art, may be similarly used. A protrusion 128 may be correspondingly formed in another substrate 116 to which the portion 114 of the first substrate 124 is to be attached after the catalyst removal process. The protrusion 128 may comprise, for example, a radially smaller cylinder protruding from a radially larger portion of the other substrate 116. The protrusion 128 may be configured to be received within the recess 126.

The polycrystalline table 112 and the portion 114 of the first substrate 124 may then be leached to remove catalyst material therefrom. Catalyst material disposed in interstitial spaces between interbonded grains of the superabrasive material of the polycrystalline table 112 and disposed in spaces between hard particles of the portion 114 of the first substrate 124 may be removed, for example, using aqua regia, or other leaching agents or methods known in the art. In some embodiments, catalyst material may be substantially completely leached from both the polycrystalline table 112 and the portion 114 of the first substrate 124 attached thereto. In other embodiments, at least some catalyst material may remain in the portion 114 of the first substrate 124 attached to the polycrystalline table 112. For example, all or substantially all of the catalyst material may remain in the portion 114 of the first substrate 124 while the polycrystalline table 112 is fully or substantially fully leached. In still other embodiments, at least some catalyst material may remain in the polycrystalline table 112 as well. Penetration of the leaching agent may be controlled to leach only a selected portion of the polycrystalline table 112, the portion 114 of the first substrate 124, or both.

The portion 114 of the first substrate 124 may be configured to enable leaching of the polycrystalline table 112. For example, where the portion 114 of the first substrate 124 comprises an annular structure having a recess 126 formed therein and extending to the polycrystalline table attached thereto, the recess may enable a leaching agent to flow to the polycrystalline table 112 without having to pass through the material of the portion 114 of the first substrate 124 or without having to pass through all of the material of the portion 114 of the first substrate 124. In this way, the recess 126 may enable the leaching agent to remove all or substantially all the catalyst material from the polycrystalline table 112 while leaving a substantial portion of the catalyst material in the annular structure of the portion 114 of the first substrate 124. The portion 114 of the first substrate 124 may also enhance the mechanical integrity and facilitate handling of the portion 114 of the first substrate 124 and attached polycrystalline table 112 because the thickness t of the portion 114 of the first substrate 124 may comprise up to about two-thirds (⅔) of the total thickness of the resulting structure, such as, for example, insert 110.

An attachment material 130 may be optionally disposed over a portion of the other substrate 116 to which the portion 114 of the first substrate 124 is to be attached. For example, the attachment material 130 may comprise a metal foil layer, such as, for example, a catalyst foil layer, disposed over the protrusion 128 and a surrounding annular surface of the other substrate 116 facing the portion 114 of the first substrate 124. In some embodiments, the attachment material 130 may comprise, for example, a braze material. In embodiments where the attachment material 130 comprises a catalyst material, the catalyst material of the attachment material 130 may be a different catalyst material than the catalyst material used to form the polycrystalline table 112. In other embodiments, the attachment material 130 may comprise an organic adhesive, such as, for example, a gum, a glue (e.g., the alcohol-catalyzed α-cyanoacrylate adhesive compositions disclosed in U.S. Pat. No. 2,768,109 issued Oct. 23, 1956 to Coover, the disclosure of which is hereby incorporated herein in its entirety by this reference), a bond, an epoxy, or any other material formed from organic chemical precursors that forms attachments, such as, for example, by crosslinking to bond. In still further embodiments, the attachment material 130 may comprise an organo-metallic adhesive, such as, for example, the organo-metallic adhesive composition disclosed in U.S. Pat. No. 4,808,659 issued Feb. 28, 1989 to Nishihara et al, the disclosure of which is hereby incorporated herein in its entirety by this reference.

As shown in FIG. 16, recess 126 may be axially aligned with the protrusion 128. The portion 114 of the first substrate 124 may be lowered over the other substrate 116 until the protrusion 128 is located within the recess 126. The optional attachment material 130 may be interposed between the portion 114 of the first substrate 124 and the other substrate 116. The portion 114 of the first substrate 124 may then be attached to the other substrate to form a cutting element or other structure comprising a polycrystalline table 112 attached to a substrate. In other embodiments, a portion of a first substrate attached to a polycrystalline table may be attached to another substrate to form an axial bearing or a radial bearing. In some embodiments, the portion 114 of the first substrate 124 may be directly attached to the other substrate 116. Thus, the portion 114 of the first substrate 124 may be interposed between the polycrystalline table 112 and the other substrate 116. In other embodiments, the protrusion 128 of the other substrate 116 may contact and be attached directly to the polycrystalline table 112, for example, when the protrusion 128 extends through the recess 126 formed in the portion 114 of the first substrate 124. The portion 114 of the first substrate 124 attached to the polycrystalline table 112 may be attached to the other substrate 116 by, for example, brazing, microwave brazing, welding, hot pressing, or using a sintering process. For example, an HTHP process, as known in the art, may be applied to the polycrystalline table 112, the portion 114 of the first substrate 124 and the other substrate 116 in a mold. In some embodiments, the pressure used in the sintering process may be at least five gigapascals (5 GPa). For example, the peak pressure may be eight gigapascals (8 GPa) or even ten gigapascals (10 GPa).

In embodiments where the polycrystalline table 112 and the portion 114 of the first substrate 124 are attached to the other substrate 116 using a sintering process, catalyst material may be swept from the other substrate 116 into the portion 114 of the first substrate 124 and the polycrystalline table 112. Catalyst material remaining in the portion 114 of the first substrate 124 may also be swept from the portion 114 of the first substrate 124 into the polycrystalline table 112. The catalyst material from the other substrate 116 may be a different catalyst material than the catalyst material used initially to form the polycrystalline table 112. For example, the polycrystalline table 112 may be formed in the presence of a cobalt-based alloy, which may then be at least substantially removed from the polycrystalline table, and the catalyst material swept from the other substrate 116 into the polycrystalline table 112 may comprise a nickel-based alloy. As another example, the polycrystalline table 112 may be formed in the presence of a cobalt-based alloy, which may then be at least substantially removed from the polycrystalline table, and the catalyst material swept from the other substrate 116 into the polycrystalline table 112 may comprise commercially pure cobalt. In some embodiments, the attachment material 130 may also comprise a reinfiltrant, such as, for example, a catalyst material (e.g., cobalt, nickel, iron, alloys of cobalt, nickel, or iron, or other catalysts known in the art) or an inert material (e.g., silicon, aluminum, copper, or other inert reinfiltrants known in the art). Thus, the recess 126 may enable the introduction of a reinfiltrant to the polycrystalline table 112 directly, without having to pass through the portion 114 of the first substrate 124 attached thereto. The polycrystalline table 112 may subsequently be subjected to another leaching process to remove catalyst material from at least a portion thereof. For example, catalyst material may be removed from a cutting face 125 of the polycrystalline table 112 to a selected depth $d_1$ within the polycrystalline table 112. The cutting face 125 may be substantially free of catalyst material. As another example, catalyst material may also be removed from a side surface 127 of the polycrystalline table 112 to a selected depth $d_2$ within the polycrystalline table 112.

Figure 17:
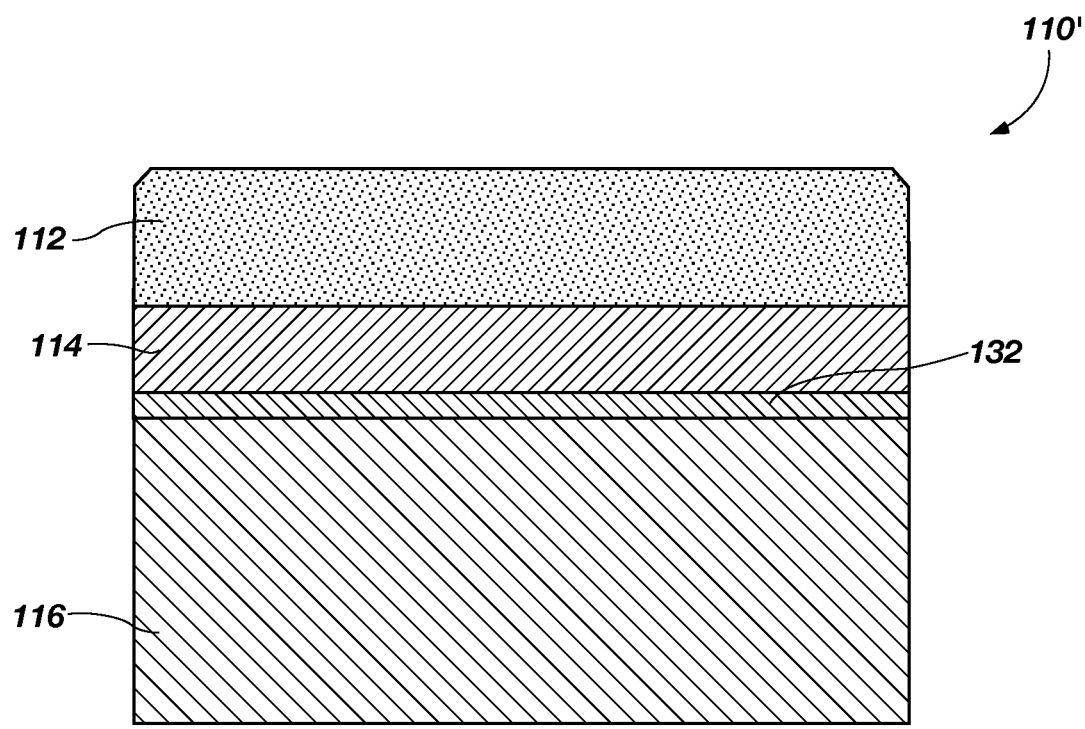
FIG. 17 illustrates a simplified cross-sectional view of an interface between a portion of a first substrate and a second substrate in accordance with an embodiment of the disclosure.

With reference to FIG. 17, a cutting element 110' in accordance with an embodiment of the present disclosure is shown. The cutting element 110' comprises a polycrystalline table 112 attached to a portion 114 of a first substrate. The portion 114 of the first substrate is attached, in turn, to another substrate 116. Thus, the portion 114 of the first substrate is interposed between the polycrystalline table 112 and the other substrate 116. An interface 132 between the portion 114 of the first substrate and the other substrate 116 may comprise a non-planar surface, such as, for example, a roughened surface. The interface 132 may be formed by grinding an end of the portion 114 of the first substrate attached to the polycrystalline table 112 prior to attaching the portion 114 of the first substrate to the other substrate. In some embodiments, a surface of the other substrate 116 facing the portion 114 of the first substrate may also be subjected to a grinding process. A surface of the portion 114 of the first substrate opposing the polycrystalline table 12 may be ground using, for example, a Blanchard grinding process. The resulting surface may have an arithmetic mean roughness value, conventionally called "Ra," of at least one one-hundredth of a microinch (0.01 μin) and up to ten microinches (10 μin). An attachment material, as has been previously described herein, may be disposed between the roughened portion 114 of the first substrate and the other substrate 116 prior to attachment. The portion 114 of the first substrate may then be attached to the other substrate 116 by, for example, brazing, microwave brazing, welding, hot pressing, or using a sintering process, as have been described previously herein. A non-planar interface 132 between the portion 114 of the first substrate and the other substrate 116 may enable a stronger attachment to be formed between the portion 114 of the first substrate and the other substrate 116. In other embodiments, the non-planar interface 132 between the portion 114 of the first substrate and the other substrate 116 may comprise a non-planar interface design, as known in the art.

Figure 18:
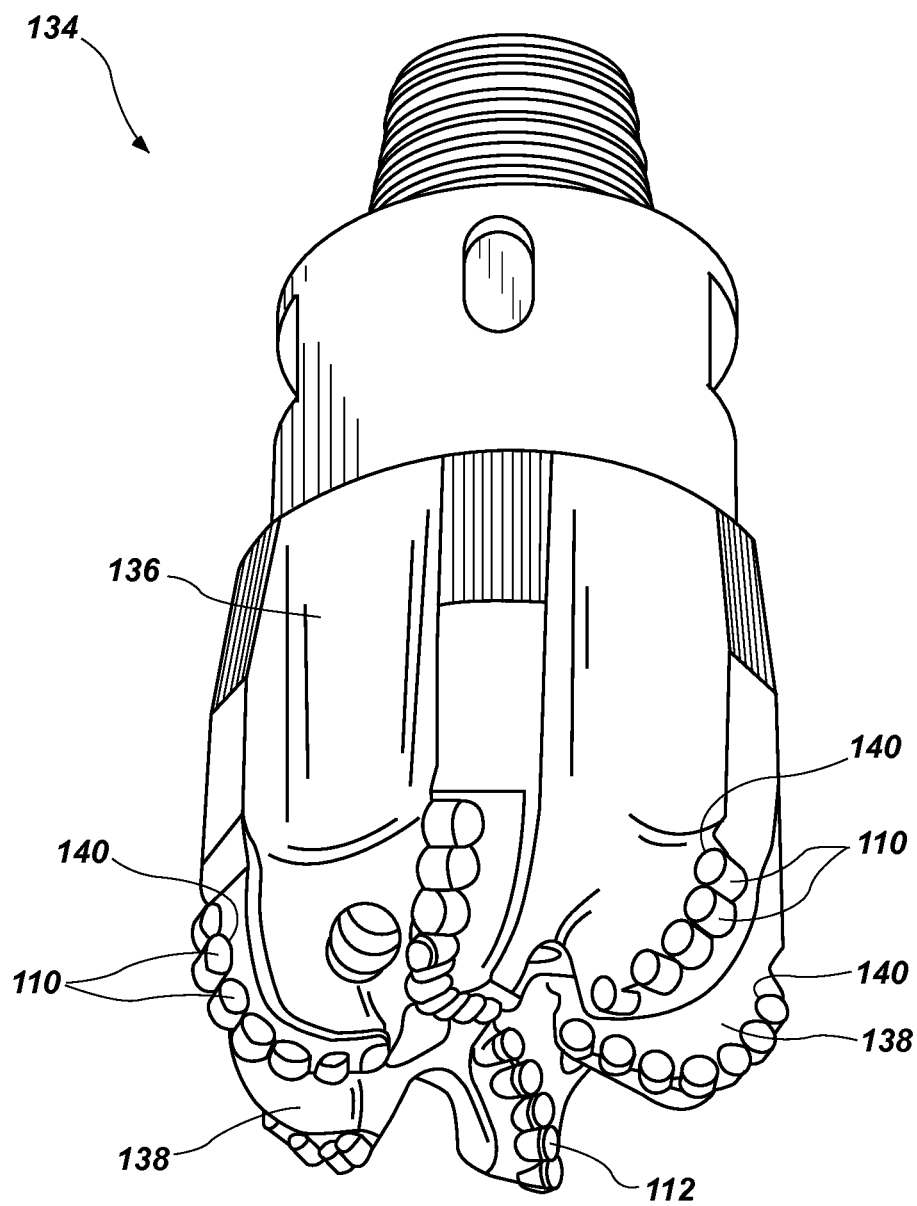
FIG. 18 depicts another earth-boring tool to which at least one cutting element comprising a polycrystalline table of the disclosure may be attached.

Referring to FIG. 18, an earth-boring tool 134 to which a cutting element 110 (e.g., any of the cutting element 110 and 110' described previously in connection with FIGS. 2, 3, 6 through 9, and 17) may be attached is shown. The earth-boring tool 134 may comprise an earth-boring drill bit and may have a bit body 136 with blades 138 extending from the bit body 136. The cutting elements 110 may be secured within pockets 140 formed in the blades 138. However, cutting elements 110 and polycrystalline tables 112 as described herein may be bonded to and used on other types of earth-boring tools, including, for example, roller cone drill bits, percussion bits, core bits, eccentric bits, bicenter bits, reamers, expandable reamers, mills, hybrid bits, and other drilling bits and tools known in the art.

While the present invention has been described herein with respect to certain embodiments, those of ordinary skill in the art will recognize and appreciate that it is not so limited. Rather, many additions, deletions, and modifications to the embodiments described herein may be made without departing from the scope of the invention as hereinafter claimed, including legal equivalents. In addition, features from one embodiment may be combined with features of another embodiment while still being encompassed within the scope of the invention as contemplated by the inventor.

What is claimed is:

1. A method of forming a polycrystalline element, comprising:
   forming a polycrystalline table on a first substrate;
   removing catalyst material from at least a portion of the polycrystalline table;
   removing the polycrystalline table and a portion of the first substrate attached to the polycrystalline table from a remainder of the first substrate, rendering a thickness of the portion of the first substrate less than a thickness of the substrate before the polycrystalline table and the portion of the first substrate were removed; and
   attaching the portion of the first substrate to another substrate, the portion of the first substrate being interposed between the polycrystalline table and the another substrate.

2. The method of claim 1, further comprising:
   disposing at least one of a catalyst material, a braze material, an inert reinfiltrant material, an organic adhesive, and an organo-metallic adhesive between the portion of the first substrate and the another substrate prior to attaching the portion of the first substrate to the another substrate.

3. The method of claim 1, further comprising:
   minimizing a thickness of the portion of the first substrate attached to the polycrystalline table.

4. The method of claim 1, wherein attaching the portion of the first substrate to another substrate comprises brazing the portion of the first substrate to the another substrate.

5. The method of claim 1, wherein attaching the portion of the first substrate to another substrate comprises:
   disposing the portion of the first substrate attached to the polycrystalline table on the another substrate; and
   subjecting the polycrystalline table, the portion of the first substrate, and the another substrate to a high temperature/high pressure (HTHP) process.

6. The method of claim 1, further comprising:
   grinding a surface of the portion of the first substrate opposing the polycrystalline table prior to attaching the portion of the first substrate to the another substrate.

7. The method of claim 1, further comprising:
forming a recess to extend at least partially through the portion of the first substrate from an end thereof opposite the polycrystalline table; and
inserting a protrusion of the another substrate into the recess prior to attaching the portion of the first substrate to the another substrate.

8. The method of claim 1, further comprising:
removing catalyst material substantially completely from the polycrystalline table prior to attaching the portion of the first substrate to the another substrate.

9. The method of claim 8, further comprising:
removing catalyst material from at least part of the portion of the first substrate prior to attaching the portion of the first substrate to the another substrate.

10. A method of forming a polycrystalline element, comprising:
subjecting a plurality of particles comprising a superabrasive material disposed on an end of a mass of hard material to a high temperature/high pressure (HTHP) process in the presence of a catalyst material to form a polycrystalline table attached to a first substrate;
removing the catalyst material from at least a portion of the polycrystalline table;
removing the polycrystalline table and a portion of the first substrate attached to the polycrystalline table from a remainder of the first substrate, rendering a thickness of the portion of the first substrate less than a thickness of the substrate before the polycrystalline table and the portion of the first substrate were removed; and
attaching the portion of the first substrate to another substrate, the portion of the first substrate being interposed between the polycrystalline table and the another substrate.

11. The method of claim 10, further comprising:
disposing at least one of a catalyst material, a braze material, an inert reinfiltrant material, an organic adhesive, and an organo-metallic adhesive between the portion of the first substrate and the another substrate prior to attaching the portion of the first substrate to the another substrate.

12. The method of claim 10, wherein attaching the portion of the first substrate to another substrate comprises brazing the portion of the first substrate to the another substrate.

13. The method of claim 10, wherein attaching the portion of the first substrate to another substrate comprises:
disposing the portion of the first substrate attached to the polycrystalline table on the another substrate, the portion of the first substrate being interposed between the polycrystalline table and the another substrate; and
subjecting the polycrystalline table, the portion of the first substrate, and the another substrate to another high temperature/high pressure (HTHP) process.

14. The method of claim 10, further comprising:
grinding a surface of the portion of the first substrate opposing the polycrystalline table prior to attaching the portion of the first substrate to the another substrate.

15. The method of claim 10, further comprising:
forming a recess to extend at least partially through the portion of the first substrate; and
inserting a protrusion of the another substrate at least partially into the recess prior to attaching the portion of the first substrate to the another substrate.

16. The method of claim 10, further comprising:
substantially removing the catalyst material from all of the polycrystalline table prior to attaching the portion of the first substrate to the another substrate.

17. The method of claim 16, further comprising:
removing catalyst material from at least part of the portion of the first substrate prior to attaching the portion of the first substrate to the another substrate.

\* \* \* \* \*